United States Patent [19]

Hilgner et al.

[11] 4,367,650
[45] Jan. 11, 1983

[54] FIXTURE FOR MOUNTING VIBRATION SENSOR NEAR LIMITED ACCESS MACHINE PARTS

[75] Inventors: Reinhard Hilgner, Karlsruhe; Wolfgang Utz, Kandel; Heinrich Schröder, Karlsruhe, all of Fed. Rep. of Germany

[73] Assignee: Siemens Aktiengesellschaft, Munich, Fed. Rep. of Germany

[21] Appl. No.: 258,531

[22] Filed: Apr. 28, 1981

[30] Foreign Application Priority Data

May 5, 1980 [DE] Fed. Rep. of Germany ....... 3017193

[51] Int. Cl.³ ............................................ G01H 11/00
[52] U.S. Cl. ..................................... 73/649; 73/661; 73/432 R; 324/158 P
[58] Field of Search ................. 73/658, 659, 660, 661, 73/649, 432 G; 324/207, 158 P; 279/41 R, 43

[56] References Cited

U.S. PATENT DOCUMENTS

| | | | |
|---|---|---|---|
| 517,787 | 4/1894 | Baumgarten | 279/43 X |
| 2,404,385 | 7/1946 | Fritts | 279/41 R X |
| 3,776,027 | 12/1973 | Campbell | 73/660 |
| 3,835,696 | 9/1974 | Amberger et al. | 73/649 |
| 3,898,562 | 8/1975 | Mizikar et al. | 324/158 P X |
| 4,018,083 | 4/1977 | Hoffman | 73/660 X |
| 4,066,949 | 1/1978 | Condrac | 324/207 |

*Primary Examiner*—Charles A. Ruehl
*Attorney, Agent, or Firm*—Kenyon & Kenyon

[57] ABSTRACT

A fixture for holding a vibration sensing transducer near a vibrating machine part, such as a turbine shaft is provided with a probe tube which holds the vibration sensing transducer. The probe tube penetrates a housing of the machine through an opening therein, the probe tube being slidably held by a collet-type holding arrangement. A setting collar is arranged outside of the collet-type arrangement to prevent the probe tube from slipping through the opening in the machine housing when the collet-type holding arrangement is loosened to permit axial mobility of the probe tube. This prevents the vibration sensing transducer from being damaged by contacting a vibrating machine part within the machine housing. In addition, the setting collar permits the vibration sensing system to be calibrated by permitting a feeler gauge to be used to vary the distance between the vibrating machine part and the vibratoon sensing transducer by a predetermined amount.

3 Claims, 2 Drawing Figures

FIXTURE FOR MOUNTING VIBRATION SENSOR NEAR LIMITED ACCESS MACHINE PARTS

BACKGROUND OF THE INVENTION

This invention relates generally to vibration sensing arrangements, and more particularly, to a vibration sensor mounting fixture which is retained in an opening of a turbine housing by a collettype holding device.

Mounting fixtures for holding vibration sensors have been applied to the measurement of the vibration or deflection of a shaft of large rotating machines such as steam turbines. In recent years, the vibration sensors which are most commonly used are of the non-contacting, distance measuring type. Such sensors perform as transducers, and operate on the eddy current principle by producing an electrical signal which corresponds to the distance between the face of the transducer and the surface of the shaft of the machine. Thus, as the distance between the transducer and the machine shaft varies as a result of vibration, a fluctuating electrical vibration signal is generated at the output terminals of the transducer.

U.S. Pat. No. 3,898,562 describes an arrangement for mounting a transducer within a machine housing. The arrangement described therein is provided with a probe tube which is externally threaded at an upper end so as to permit threaded engagement with an internal thread of a base plate which is mounted on the machine housing. The distance between the measuring surface of the sensing unit which is located on the lower end of the probe tube, and the vibrating machine part is accomplished by rotating the probe tube in the mounting plate so that the threaded engagement causes an axial adjustment of the depth of the probe tube into the machine housing. It is apparent, therefore, that the permissible range of travel in the axial direction in this known system is relatively small, thereby requiring a variety of mounting fixtures or probe tubes to be provided for different depths. In addition, the manufacturing processes required to produced the large diameter threads on the exterior of the probe tube and the interior of the mounting plate result in substantial manufacturing costs.

It is, therefore, an object of this invention to provide an improved mounting fixture for a vibration sensor which permits continuous axial adjustment of the depth to which the vibration sensor protrudes into the machine housing, over a range of 25% of the maximum protrusion.

It is a further object of this invention to provide a mounting fixture for a vibration sensor which easily permits the vibration sensor to be placed at a predetermined calibration distance from the vibrating part within the machine which is desired to measured.

BRIEF SUMMARY OF THE INVENTION

The foregoing and other objects are achieved by this invention which provides a mounting fixture for a vibration sensor, the mounting fixture having an probe tube fastened in an opening of the machine housing by a collet holder of the type known in the art. An axially movable and lockable setting collar is arranged on the probe tube on the other side of the collet holder from the machine housing.

The collet holder may be easily operated from the outside of the machine to permit continuous adjustment of the extent to which the probe tube penetrates the housing of the machine, over a relatively large range. During the times that the collet holder is open to permit slidable adjustment of the protrusion depth of the probe tube and the vibration sensing transducer, the setting collar prevents the probe tube from slipping through the opening in the machine housing, and the vibration sensing transducer from impacting the vibrating machine part. The setting collar may be preadjusted at a position which permits the vibration sensing transducer to be at a predetermined distance from the vibrating machine part. This permits calibration of the vibration sensing system. The calibration position of the setting collar may be established by introducing a feeler gauge between the setting collar and its contact surface.

BRIEF DESCRIPTION OF THE DRAWINGS

Comprehension of the invention is facilitated by reading the following detailed description in conjunction with the annexed drawings, in which.

DETAILED DESCRIPTION

Figure 1:
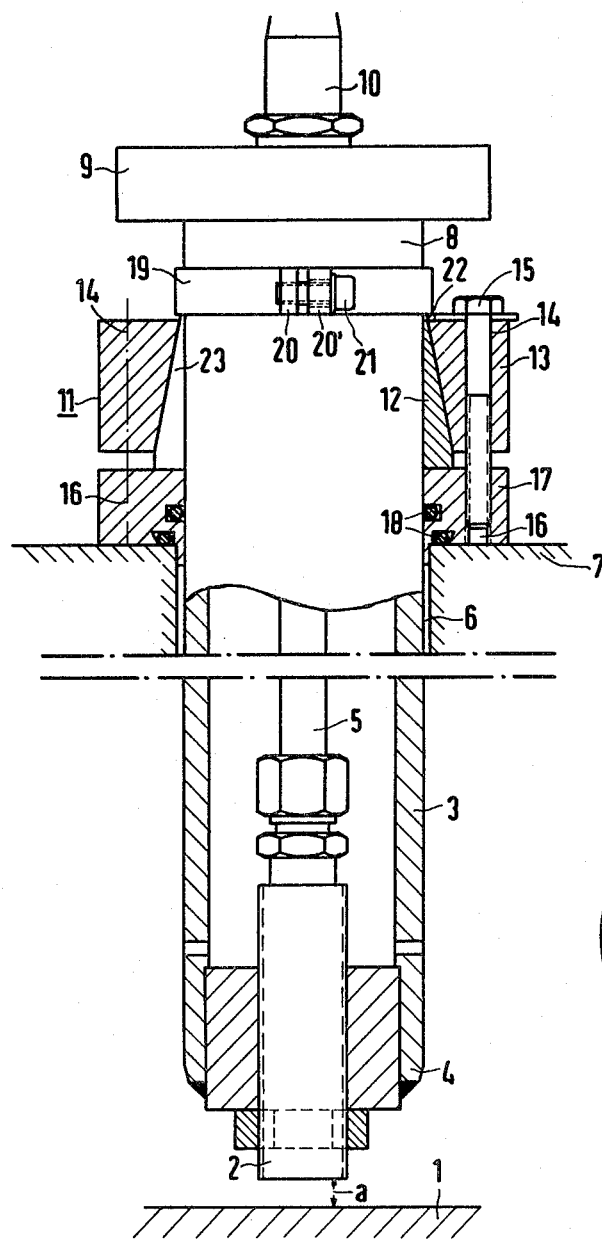
FIG. 1 is a cross-sectional representation of a mounting fixture for maintaining a vibration sensing transducer near a vibrating machine part, in accordance with the principles of the invention.

FIG. 1 shows a vibration sensing transducer, which may be of the inductive type, being held at a predetermined distance a from the surface of a vibrating machine part 1, which may be a turbine shaft. In many machines which may employ the subject invention, the accessibility of turbine shaft 1 may be very limited. According to the invention, transducer 2 is placed near the almost inaccessible vibrating turbine shaft 1 by being disposed in a lower section 4 of a rigid probe tube 3. The transducer is connected by a cable 5 to processing circuitry (not shown) which is located outside of the machine. Probe tube 3 penetrates a machine housing 7 through a housing opening 6. The probe tube is closed at its upper end by a cover plate 9 which contains a lead-through connector 10 for cable 5.

Probe tube 3 is mechanically coupled to machine housing 7 so as to be continuously adjustable in the axial direction, by a collet holder 11. Collet holder 11 consists of a clamping ring 12 which is provided with at least one longitudinal slot 23. The clamping ring is placed around probe tube 3, and has a cylindrical inner surface and a conical outer surface. A pressure ring 13 which has a conical internal bore is arranged around clamping ring 12. Pressure ring 13 is further provided with a plurality of evenly spaced holes 14 parallel to its longitudinal central axis.

A plurality of screws 15 are inserted through holes 14 of pressure ring 13, and threadedly engaged with matching tapped holes 16 in a mounting plate 17. Mounting plate 17 is permanently affixed to machine housing 7. As screws 15 are tightened so as to draw pressure ring 13 toward mounting plate 17, an inwardly radial force is exerted against clamping ring 12 so as to create a firm mechanical coupling between machine housing 7 and probe tube 3.

Mounting plate 17 is provided with sealing rings 18 to sealoff the interior of machine housing 7 from the outside. Sealing rings 18 are respectively arranged between mounting plate 17 and machine housing 7, and between the mounting plate and probe tube 3.

Figure 2:
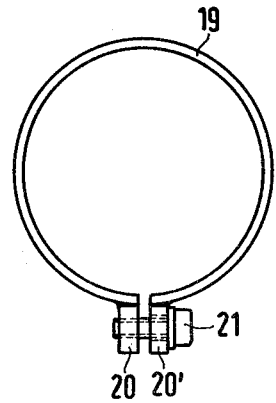
FIG. 2 is an illustration of a setting collar which is used in the embodiment of FIG. 1.

A setting collar 19 is disposed on an upper end section 8 of probe tube 3. As shown in FIG. 2, setting collar 19 is formed of a metal band which is bent into an open circle in the manner of a tube clamp. The setting collar is provided with end portions 20 and 20' which are connected by a screw 21 which is arranged substantially tangential to the setting collar. FIG. 1 shows setting collar 19 arranged on the portion of rigid probe 3 which extends outside of machine housing 7.

Distance a between vibration sensing transducer 2 and turbine shaft 1 may be set and locked by tightening screw 21 of setting collar 19 which rests on a contact surface 22 of clamping ring 12 to prevent further penetration of the probe tube into the machine housing. Once setting collar 19 has been locked in place by screw 21, probe tube 3, with vibration sensing transducer 2, can be firmly coupled to machine housing 7 by tightening screws 15.

Calibration of the system or checking of the sensing unit is achieved by opening collet holder 11 by loosening screws 15 so that probe tube 3 may be pulled out slightly to permit a feeler gauge to be introduced between the lower portion of setting collar 19 and contact surface 22. Since this operation increases distance a by a predetermined amount corresponding to the thickness of the feeler gauge, illustratively one millimeter, the proper setting and operability of vibration sensing transducer 2 can be checked during operation.

Although the invention has been described in terms of a specific embodiment and application, persons skilled in the art, in light of this teaching, can generate additional embodiments without exceeding the scope of the claimed invention. Accordingly, the drawings and description of the specific illustrative embodiment illustrate the principles of the invention, and should not be construed to limit the scope thereof.

What is claimed is:

1. A fixture for mounting a sensing transducer in a machine, the fixture having a probe tube having a longitudinal axis, the probe tube being fastened at an opening of a machine housing so as to be axially movable therethrough, the sensing transducer being disposed at a lower end portion of the probe tube which is inserted within the machine housing, the fixture further comprising:

collet-type holding means for coupling the probe tube to the machine housing in an axially slidable manner; and setting collar means disposed around the probe tube on the other side of said collet-type holding means from the machine housing, said setting collar means being in contact with a contact surface of said collet-type holding means for facilitating axial displacement of the probe tube by a predetermined distance.

2. The fixture of claim 1 wherein said collet-type holding means further comprises:

clamping ring means having a cylindrical inner surface and a tapered outer surface, said clamping ring means being arranged around an upper cylindrical portion of the probe tube, said clamping ring means being further provided with at least one longitudinal slot and said contact surface for contacting said setting collar means;

pressure ring means having a conical center bore, said pressure ring means being arranged over said clamping ring means, said pressure ring means being further provided with a rim having a plurality of holes arranged parallel to a central axis of said pressure ring means; and a plurality of threaded means for coupling said pressure ring means to the machine housing, said threaded means forcing said pressure ring means against said clamping ring means so as to mechanically couple the probe tube to the machine housing.

3. The fixture of claim 1 wherein said setting collar means consists of a metal band formed into an open circle, said metal band having end portions which are coupled to one another by a threaded screw, said threaded screw being arranged substantially tangential to said open circle.

* * * * *